United States Patent
Blocker (10) Patent No.: US 9,109,374 B1
(45) Date of Patent: Aug. 18, 2015

(54) LANDSCAPE TIMBER ANCHORING SYSTEM

(75) Inventor: Lloyd R. Blocker, Tarpon Springs, FL (US)

(73) Assignee: Border Blocks Landscaping Anchoring Systems, Inc., Bastrop, LA (US)

( * ) Notice: Subject to any disclaimer, the term of this patent is extended or adjusted under 35 U.S.C. 154(b) by 726 days.

(21) Appl. No.: 12/229,772

(22) Filed: Aug. 28, 2008

(51) Int. Cl.
| E04H 17/14 | (2006.01) |
| E04G 21/32 | (2006.01) |
| E04H 17/16 | (2006.01) |
| A01G 1/08 | (2006.01) |

(52) U.S. Cl.
CPC ............. *E04G 21/3233* (2013.01); *A01G 1/08* (2013.01); *E04H 17/16* (2013.01)

(58) Field of Classification Search
CPC ....... E04G 21/3233; E04H 17/16; A01G 1/08
USPC .............. 256/19, 22, 59, 65.01, 65.02, 65.11, 256/65.14; 52/119, 705, 102; 404/6, 9, 13; 405/286, 284, 302.4, 302.6; 446/108, 446/111, 114, 117, 124, 128; D25/38, D25/42–44
See application file for complete search history.

(56) References Cited

U.S. PATENT DOCUMENTS

| 69,444 | A | * | 10/1867 | Johnson ........................ 256/59 |
| 4,540,160 | A | * | 9/1985 | Zanavich et al. ............... 256/19 |
| 4,910,910 | A | * | 3/1990 | Jones ................. 47/33 |
| 5,030,029 | A | * | 7/1991 | Johnsen .......................... 404/6 |
| 5,178,492 | A | * | 1/1993 | Meheen ....................... 405/284 |
| D348,592 | S | * | 7/1994 | Scott et al. ....................... D8/1 |
| 5,848,927 | A | * | 12/1998 | Frederiksen ................. 446/128 |
| 6,088,987 | A | * | 7/2000 | Simmons et al. ............ 52/592.6 |
| 6,135,424 | A | * | 10/2000 | Bracke ............................ 256/59 |
| 6,141,928 | A | * | 11/2000 | Platt ............................... 52/296 |
| 6,261,207 | B1 | * | 7/2001 | Publicover et al. ............. 482/27 |
| 6,718,710 | B2 | * | 4/2004 | Platt ............................... 52/296 |
| 6,782,624 | B2 | * | 8/2004 | Marsh et al. ............... 29/897.32 |
| 6,851,660 | B1 | | 2/2005 | Cravatt |
| 7,530,550 | B2 | * | 5/2009 | Fattori ...................... 256/65.05 |
| 2006/0248816 | A1 | * | 11/2006 | Williams ..................... 52/169.1 |

* cited by examiner

*Primary Examiner* — Daniel P Stodola
*Assistant Examiner* — Nahid Amiri
(74) *Attorney, Agent, or Firm* — Richard L. Vail; Kean Miller LLP (57) ABSTRACT

An anchoring system for landscape projects uses at least a pair of hollow lightweight spaced apart post such that each post has a body member removably sitting atop a base and having either another body member or a cap sitting atop its upper surface. Each post has openings thereon such that a landscape timber extends between corresponding openings on adjacent body members pairs. The hollow internal cavity of each post may be filled with appropriate weighting material.

18 Claims, 10 Drawing Sheets

LANDSCAPE TIMBER ANCHORING SYSTEM

BACKGROUND OF THE INVENTION

The present invention relates to a lightweight system that allows for the precise placement, assembly, and anchoring of an entire landscape timber layout within a landscaping project.

BACKGROUND OF THE PRIOR ART

Landscape timbers are used for their aesthetic as well as functional values in a landscaping project. Landscape timbers help highlight areas of landscaping interest such as trees and flower gardens. As the timber itself tends to be a high quality wood that is chosen for its beauty and relationship to the landscaping for which it is intended, the timbers enhance the overall appeal of the landscaping project.

Additionally, the landscape timbers serve a functional value. A system of timbers can cordon off an area to prevent unwanted intrusion by, for example, people or horses. Additionally, the timbers are used to build up an area, with the timbers serving to hold back and retain the soil in the built up area.

Landscape timbers are, by design, naturally very heavy and are relatively difficult to manipulate, making placement of such timbers into a desired position with a relatively high degree of accuracy desired within a high quality landscaping job very difficult. As the landscape timbers are supported by the soil upon which they rest, the landscape timbers tend to shift over time with the natural expansion and contraction of the soil.

Accordingly, landscape timber anchoring devices have been proposed. Such devices help to properly align the landscape timbers and hold them generally steady over time irrespective of the soil's desire to expand and contract. Such prior art devices, which work with varying degrees of efficiency, tend to have one or more drawbacks. Some prior art devices are relatively complex in design and construction, making such devices expensive to manufacture and install and specifically making proper alignment of the timbers tricky. Other devices, which have a subterranean anchoring method, only allow a single timber to be anchored at a given spot and do not allow stacking of the timbers thereby limiting the height of the landscape timber structure that can be built. Still other devices only allow a very limited number of geometric shapes that can be built by the systems, which shapes tend to be rectangular.

Therefore, a need in the art for a landscape timber anchoring system that overcomes the aforementioned needs in the art. Such a system must allow for relatively precise placement of landscape timbers within an overall landscape project that makes uses of the timbers and the system must be of relatively simple design and construction and must be relatively easy to install. Such a system must allow for landscape timber systems to be built more than one timber in height and must allow for a robust number to geometric shape to be built.

U.S. Pat. No. 6,851,660 to Cravatt, incorporated herein by reference, addresses the above-mentioned needs in the art by providing a landscape timber anchoring system that allows a user to be able to place landscape timbers with relative precision within an overall landscape project. The landscape timber anchoring system is of relatively simple design and construction and is relatively easy to install. The Cravatt system allows for landscape timber systems to be built more than one timber in height and also allows for a robust number of geometric shapes to be achieved by the system. With further development and refinement, the present invention furthers the objectives and functional attributes of the Cravatt system

SUMMARY OF THE INVENTION

The landscape timber anchoring system of the present invention is a landscape timber anchoring system that allows a user to be able to place landscape timbers with relative precision within an overall landscape project. The landscape timber anchoring system is of relatively simple design and construction and is relatively easy to install so as to be readily affordable and attractive to a wide segment of consumers for this type of product. The landscape timber anchoring system, like its predecessor the Cravatt system, allows for landscape timber systems to be built more than one timber in height and also allows for a robust number of geometric shapes to be achieved by the system.

The landscape timber anchoring system of the present invention is comprised of a first body member that a first upper surface with a first series of protrusions extending upwardly therefrom and a first lower surface having a first set of receivers. The first upper surface and the first lower surface have at least one first sidewall extending therebetween, the first sidewall has at least one first opening therein. A first base has a second upper surface and an opposing second lower surface such that the second upper surface has a second series of protrusions extending upwardly therefrom. The first body member is positioned atop the first base such that each of the first receivers receives a respective one of the second protrusions in order to maintain the first body member atop the first base. A first cap has a first top surface and an opposing first bottom surface and a series of second receivers located on the first bottom surface. The first cap is positioned atop the first body member such that each of the second receivers receives a respective one of the first protrusions in order to maintain the first cap atop the first body member. Similarly, a second body member has a third upper surface with a third series of protrusions extending upwardly therefrom and a third lower surface having a third set of receivers. The third upper surface and the third lower surface have at least one second sidewall extending therebetween, the second sidewall has at least one second opening. A second base has a fourth upper surface and an opposing fourth lower surface such that the fourth upper surface has a fourth series of protrusions extending upwardly therefrom. The second body member is positioned atop the second base such that each of the third receivers receive a respective one of the fourth protrusions in order to maintain the second body member atop the second base. A second cap has a second top surface and an opposing second bottom surface and a series of fourth receivers located on the second bottom surface. The second cap is positioned atop the second body member such that each of the fourth receivers receives a respective one of the third protrusions in order to maintain the second cap atop the second body member. A first landscape timber has a first end received within one of the first openings and a second end received within one of the second openings. The first body member has a first internal cavity and the second body member has a second internal cavity such that a weighting material may be disposed within the first internal cavity or the second internal cavity such that the weighting material may be selected from the group consisting of water, sand, rock and aggregate. The first base, the first body member, and the first cap may each be made from plastic and the second base, the second body member, and the second cap may each also be made from plastic. At least one first generally vertically disposed slit may be disposed within the first post while a second generally vertically disposed slit may be disposed within the second post. A first generally flat plank has a third end received within the first slit and a fourth end received within the second slit. A third body member may be provide and have a fifth upper surface with a fifth series of protrusions extending upwardly therefrom and a fifth lower surface having a fifth set of receivers. The fifth upper surface and the fifth lower surface have at least third second sidewall extending therebetween, the third sidewall having at least one third opening. A third base has a sixth upper surface and an opposing sixth lower surface such that the sixth upper surface has a sixth series of protrusions extending upwardly therefrom. That the third body member is positioned atop the third base such that each of the fifth receivers receives a respective one of the sixth protrusions in order to maintain the third body member atop the third base. A third cap has a third top surface and an opposing third bottom surface and a series of sixth receivers located on the third bottom surface. The third cap is positioned atop the third body member such that each of the sixth receivers receives a respective one of the fifth protrusions in order to maintain the third cap atop the third body member. A second landscape timber has a third end received within the first opening and a fourth end received within the third opening. A plug may be is removably received within one of the first openings or one of the second openings or one of the third openings or some combination thereof. The third body member has a third internal cavity which may be filled with the weighting material. The third base, the third body member, and the third cap may also each be made from plastic. A third generally vertically disposed slit may be disposed within the third post while a second generally flat plank has a seventh end received within one of the first slits and an eight end received within the third slit.

BRIEF DESCRIPTION OF THE DRAWINGS

Similar reference numerals refer to similar parts throughout the several views of the drawings.

DESCRIPTION OF THE PREFERRED EMBODIMENT

Figure 1:
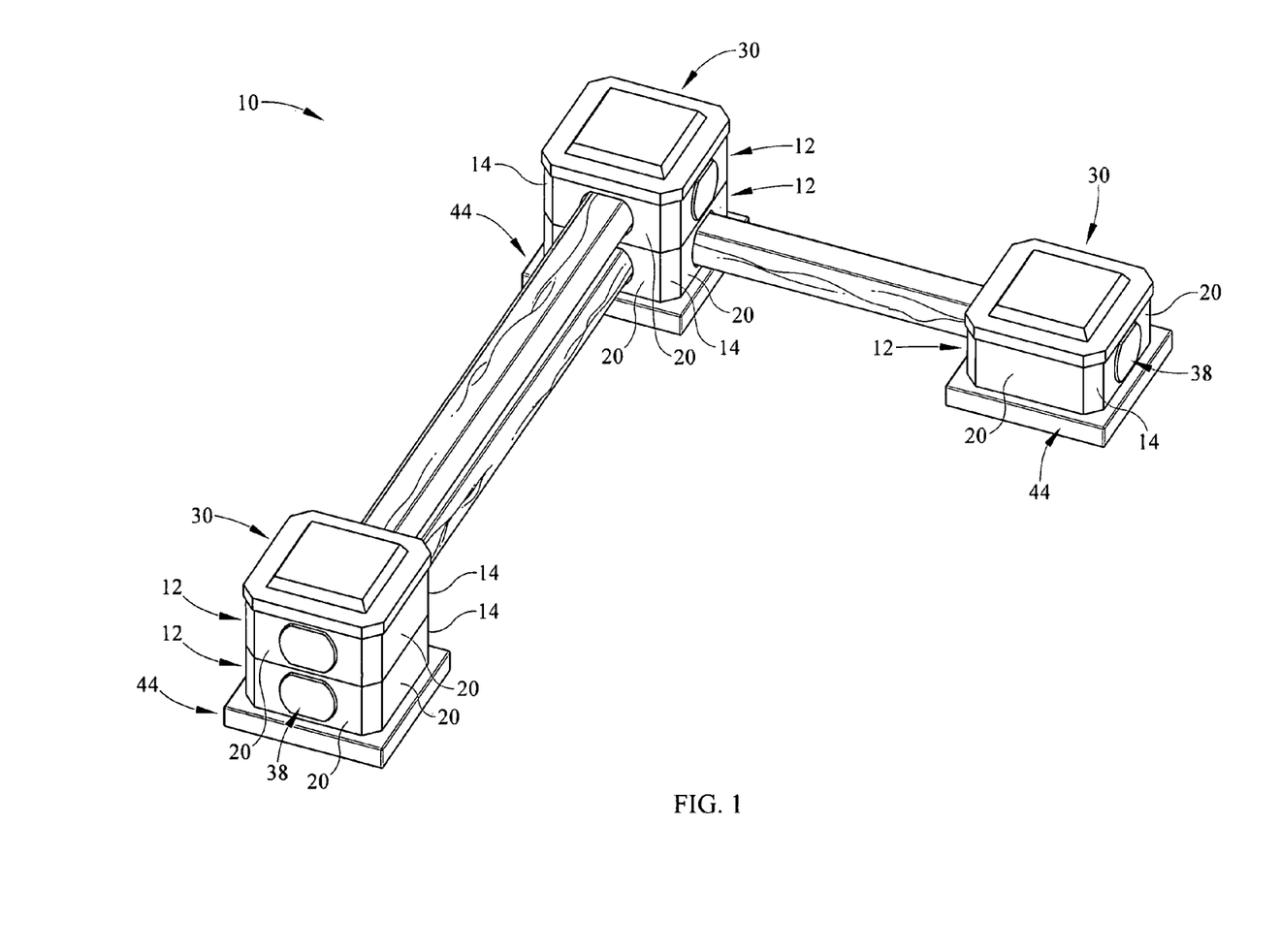
FIG. 1 is a perspective view of the landscape timber anchoring system of the present invention.
Figure 2:
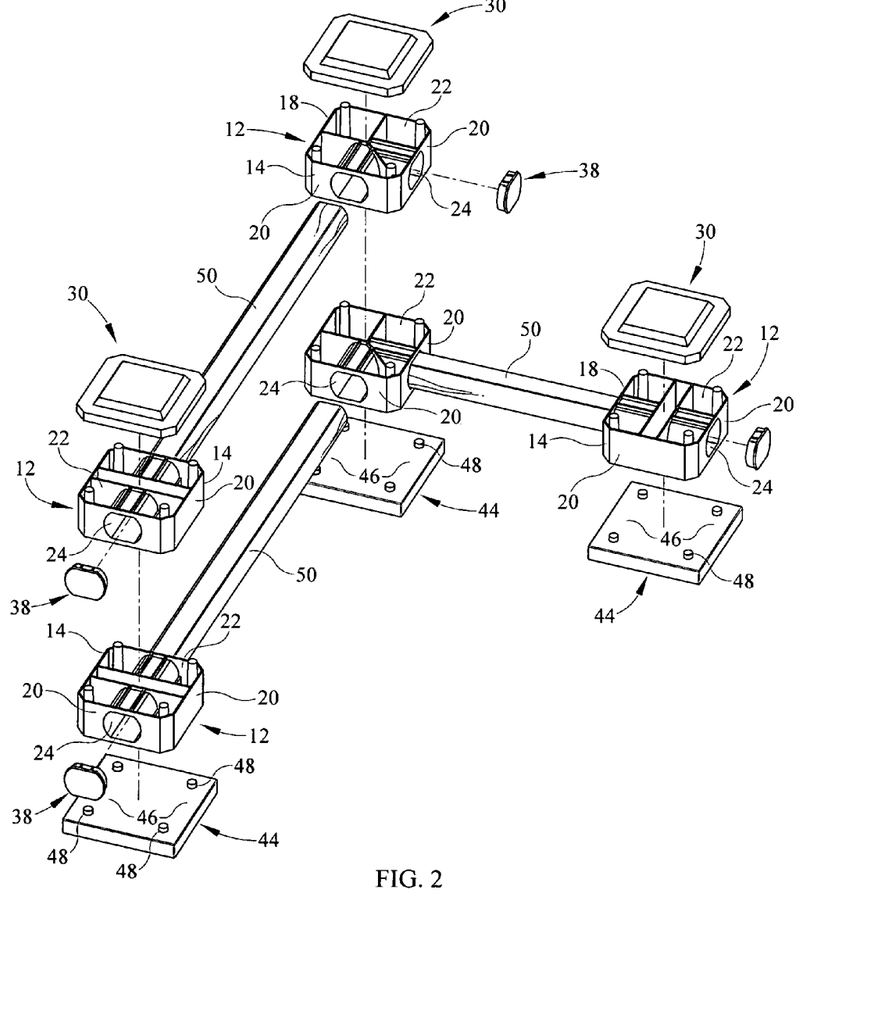
FIG. 2 is an exploded perspective view of the landscape timber anchoring system.
Figure 3:
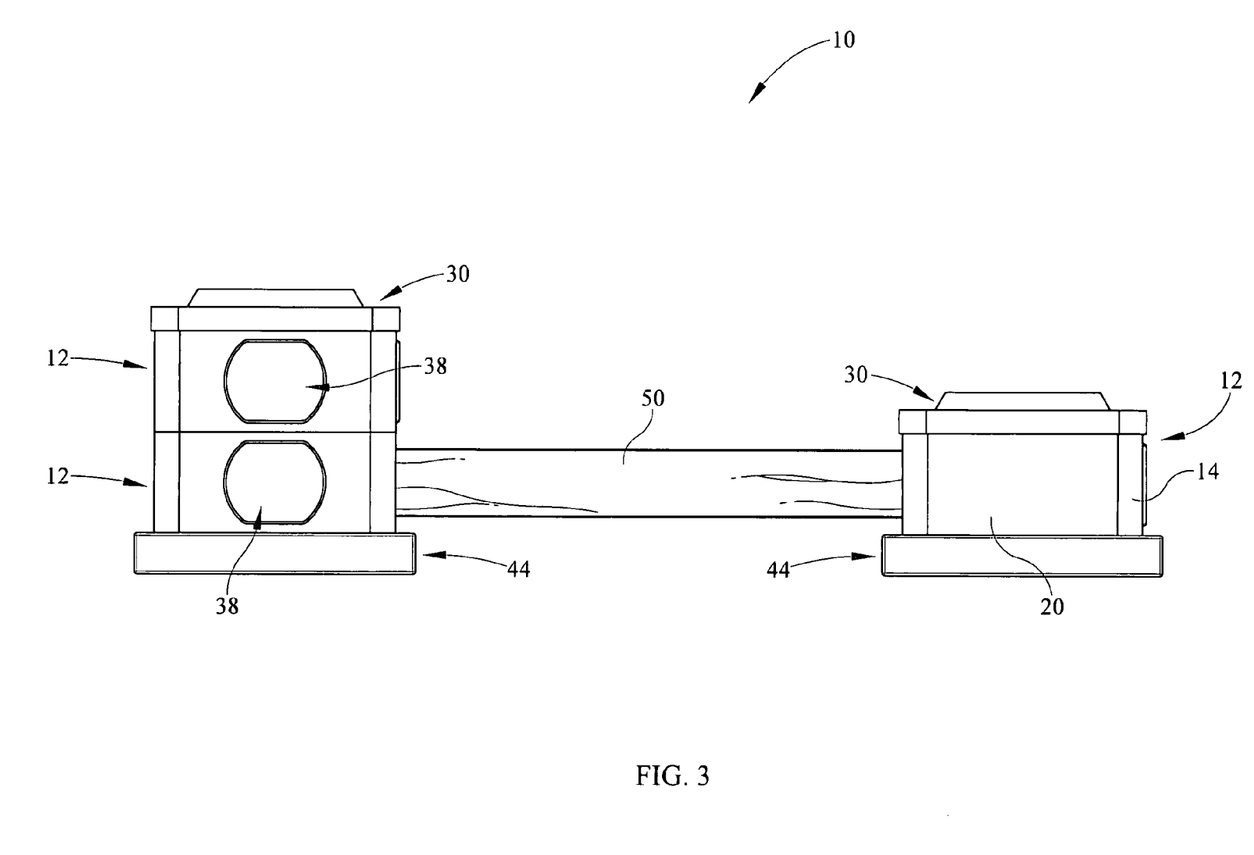
FIG. 3 is an elevation of the landscape timber anchoring system.
Figure 4:
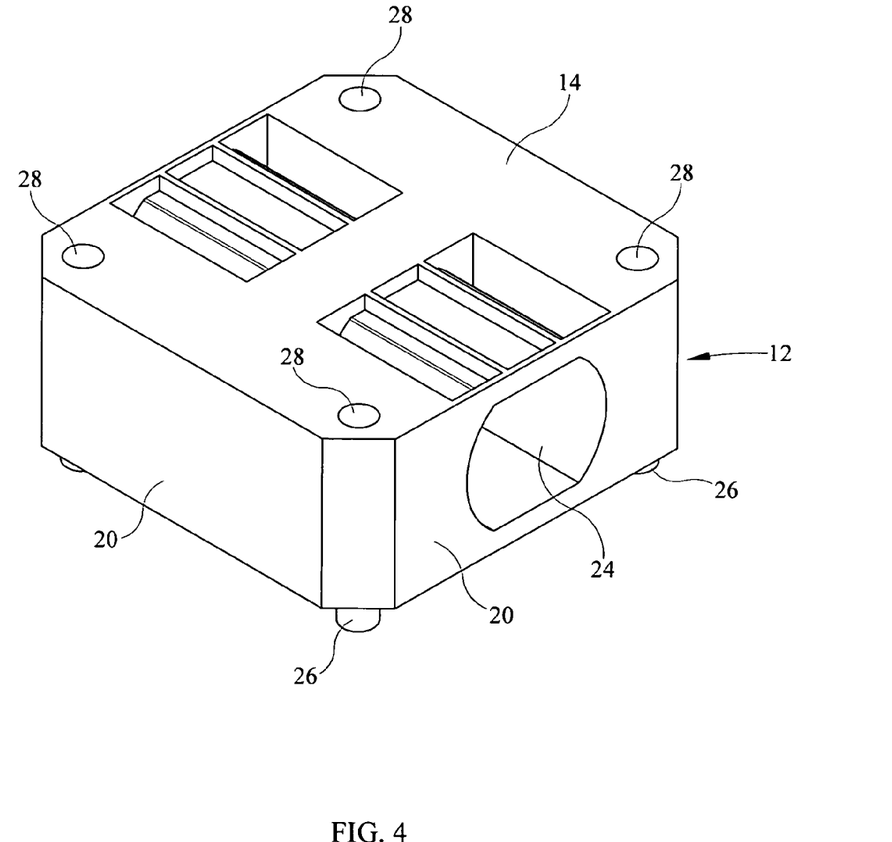
FIG. 4 is an underneath perspective view of a post having 180 degree spaced apart timber openings of the landscape timber anchoring system.
Figure 5:
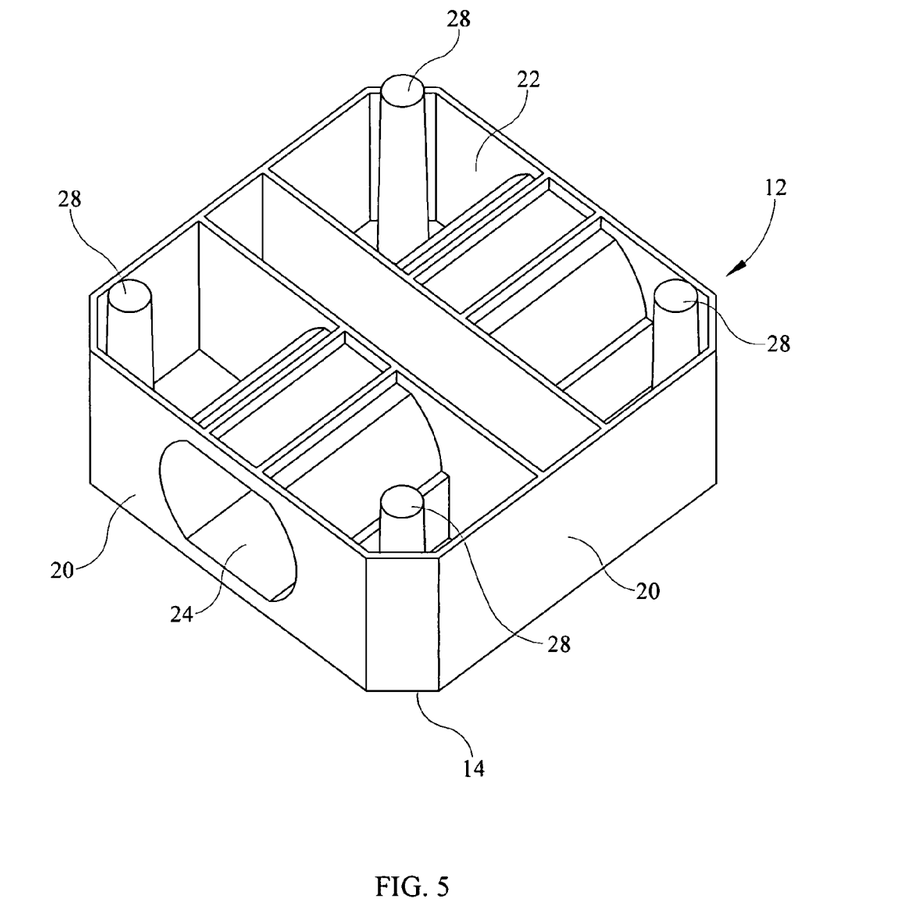
FIG. 5 is an upper perspective view of the post of the landscape timber anchoring system of FIG. 4.
Figure 6:
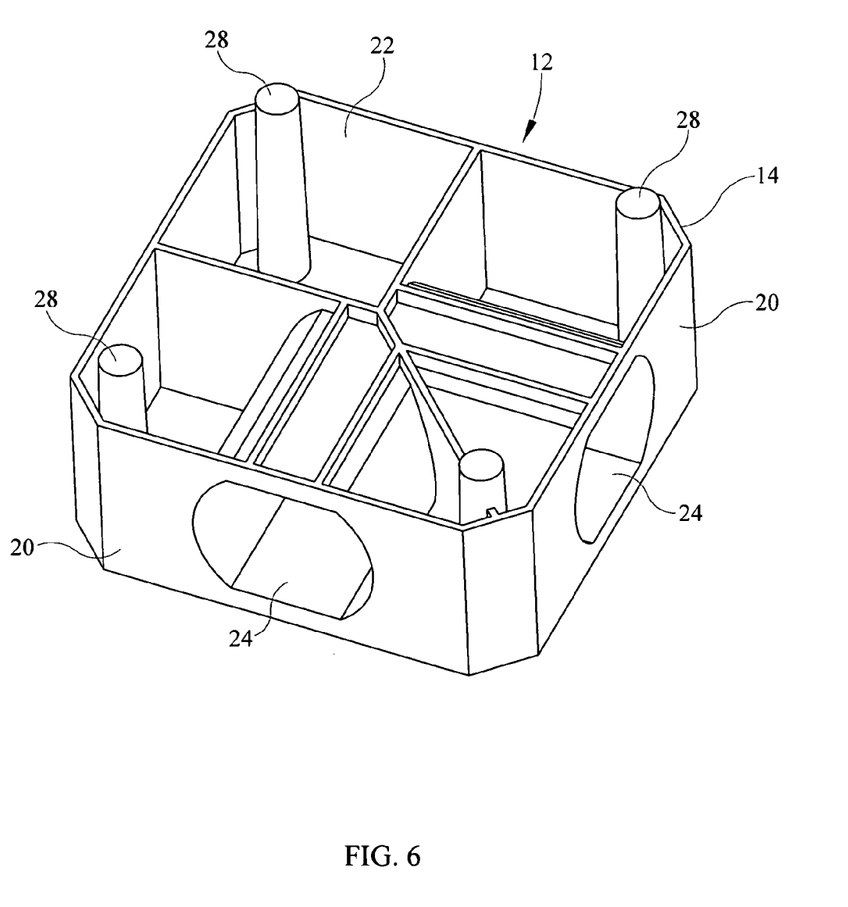
FIG. 6 is an upper perspective view of a post of the landscape timber anchoring system having 90 degree spaced apart timber openings.

Referring now to the drawings, it is seen that the landscape timber anchoring system of the present invention, generally denoted by reference numeral 10, is comprised of at least a pair of posts 12, which posts 12 comprise a body member 14 with a lower surface 16, an upper surface 18, and four side surfaces 20 (although the body member 14 is illustrated as generally rectangular, other shapes for the body member are also possible including cylindrical, triangular, octagonal, etc.). The body member 14 is hollow so as to have an internal cavity 22 therein. At least a pair of openings 24 is located on the body member 14 such that the openings 24 may be located on opposite side surfaces 20 of the body members as best seen in FIGS. 1, 2, 4, and 5, or the openings 24 may be on adjacent side surfaces 20 of the body member 14 as best seen in FIGS. 1, 2, and 6. The openings 24 may but need not necessarily be, connected to one another. Additional vertically offset opening pairs 24 may be provided on the body member 14, the location of each such vertically offset opening pair 24 may but need correspond to the location of the original openings 24. As seen, a series of protrusions 26 extend upwardly from the upper surface 18 of the body member 14, each protrusion 26 being located proximate a respective one of the corners of the body member 14. A corresponding first set of receivers 28 is located on the lower surface 16 of the body member 14, each first receiver 28 being located proximate a respective one of the corners of the body member 14.

Each body member 14 is made from plastic or similar material so as to be relatively lightweight and the outer facade of each body member 14 may be decoratively adorned as desired.

Of course some or all of the body members 14 of the landscape timber anchoring system 10 of the present invention may have a shape other than the disclosed rectangular shape, such as a hexagon, a cylinder, an octagon, etc., depending on the particular landscaping project that is being addressed. In such configurations, openings 24 may be located on more than two of the sides of the body member 14.

Figure 7:
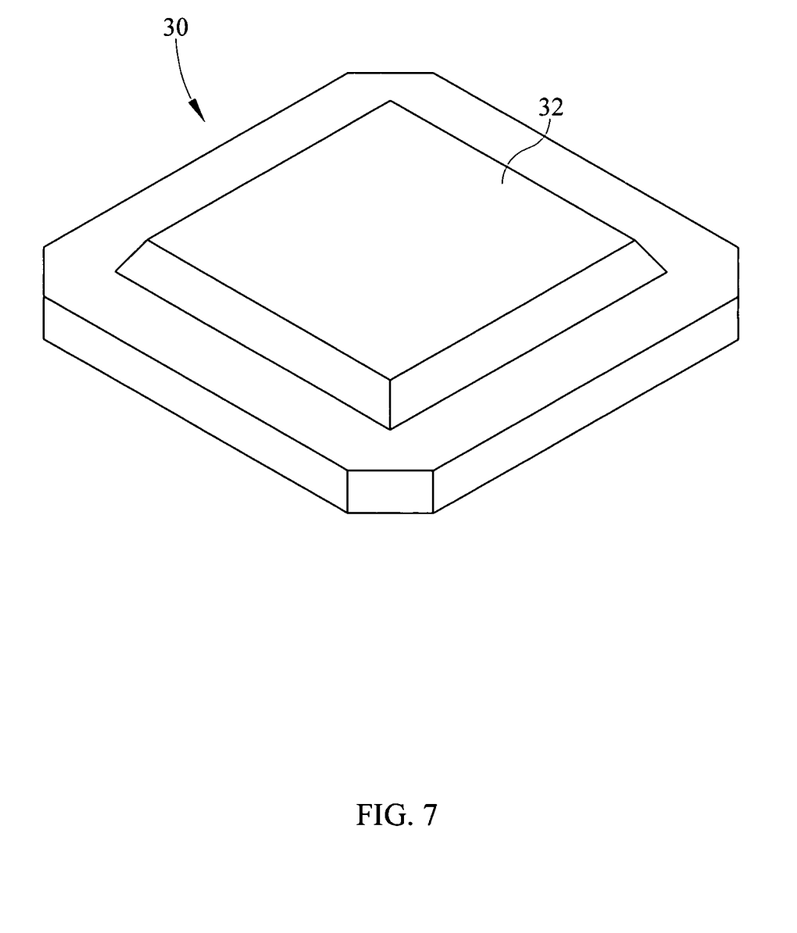
FIG. 7 is an upper perspective view of a cap of the landscape timber anchoring system.
Figure 8:
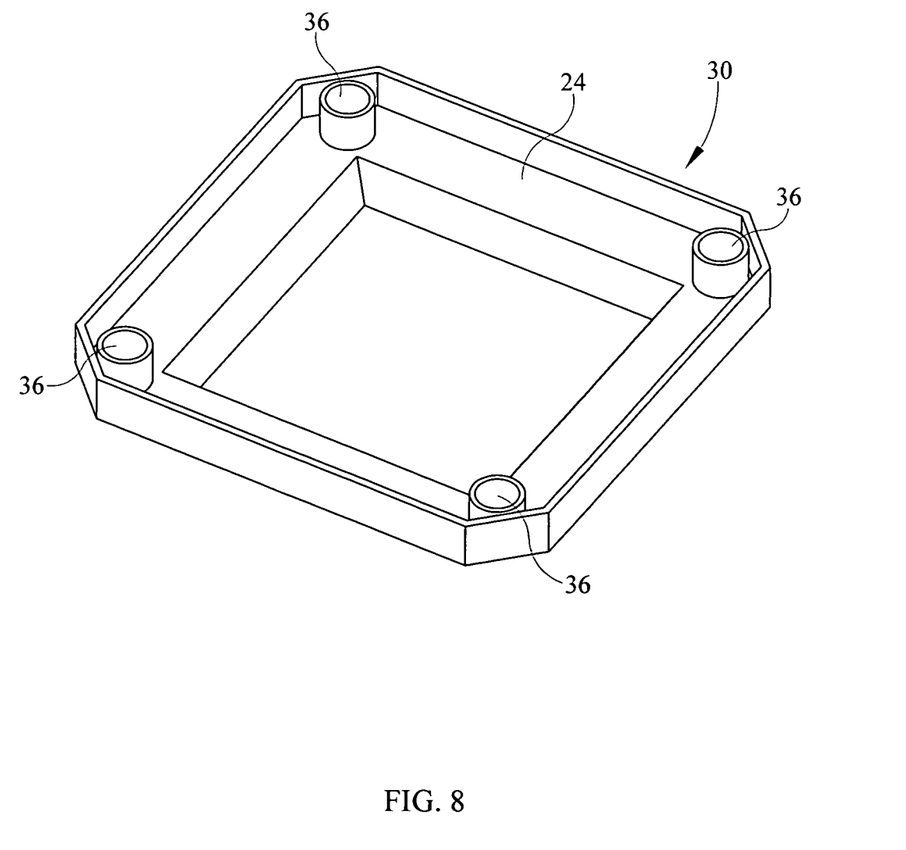
FIG. 8 is a lower perspective view of the cap of the landscape timber anchoring system.

A cap 30 has a decorative top side 32 and an underside 34 which has a second set of receivers 36 thereon, each second receiver 36 being located proximate a respective one of the corners of the cap 30. The top side 32 of the cap 30 may have appropriate decorative elements thereon as desired.

Figure 9:
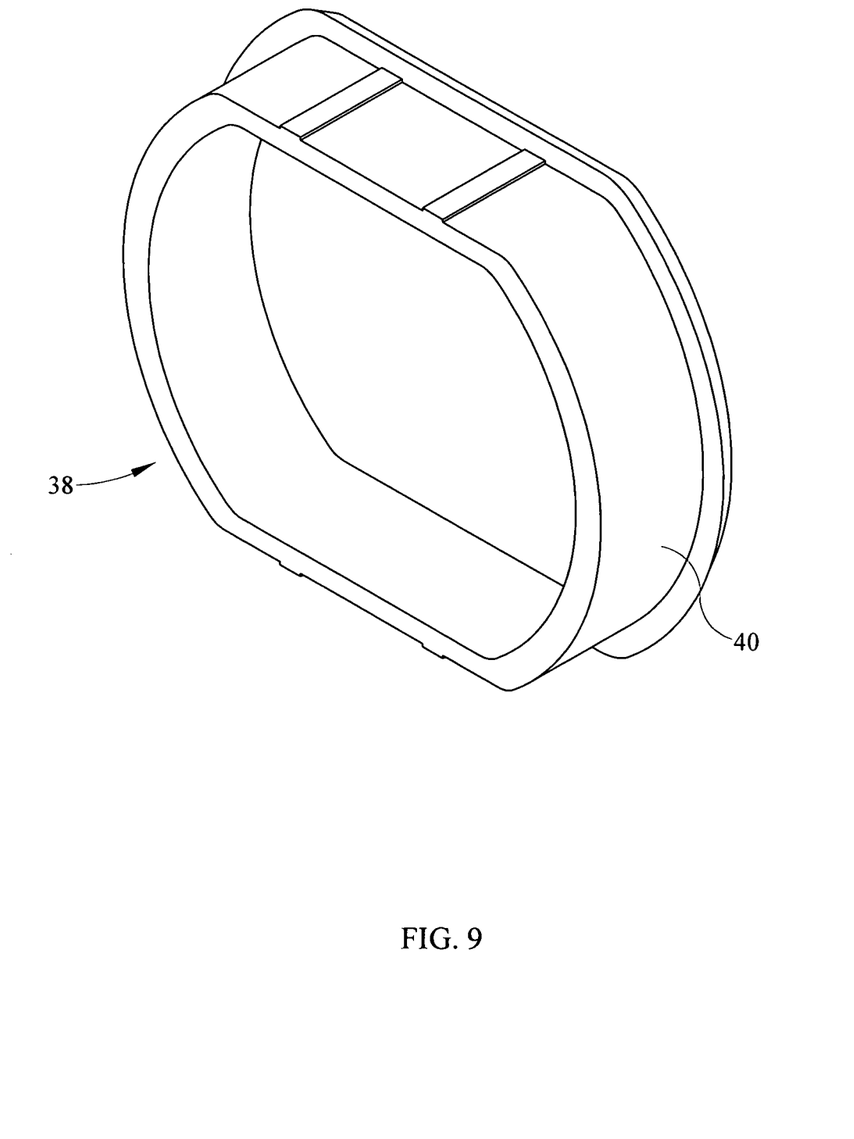
FIG. 9 is a perspective view of a plug of the landscape timber anchoring system.
Figure 10:
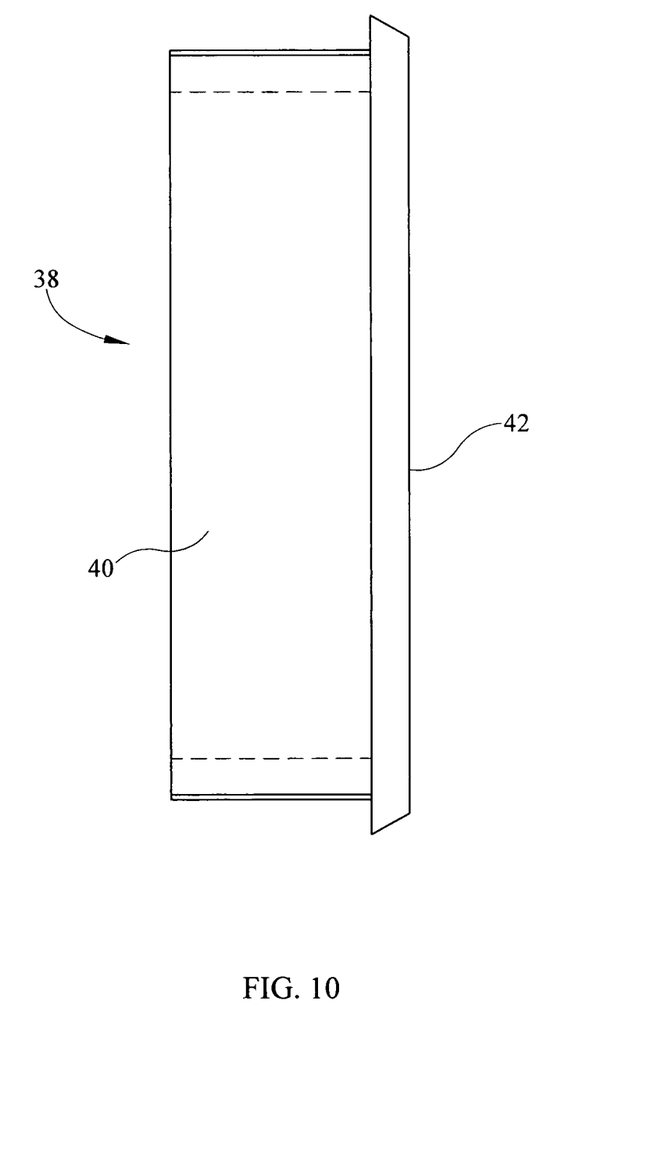
FIG. 10 is an elevation view of the plug of the landscape timber anchoring system.

A plug 38 has a sidewall 40 that corresponds to the shape and size of the openings 24 of the body member 14 and a top 42 which may be decorative as desired.

A base 44 has an upper surface 46 that has a second series of second protrusions 48 thereon, each second protrusion 48 located proximate a corner of the base 44.

In order to use the landscape timber anchoring system 10 of the present invention, a series of posts 12 are placed as desired at a landscaping project. Each post 12 is positioned on a base 44 such that each second protrusion 48 of the base 44 is received within a respective one of the first series of female first receivers 28 of the body member 14 in order to attach the post 12 to the base 44. The internal cavities 22 of each post 12 may be filled with an appropriate weighting material, such as water, sand, gravel, aggregate, etc., in order to. weigh down each post 12 and help stabilize the system 10. A landscape timber 50 extends between a pair of posts 12 such that the timber 50 is received within one of the openings 24 of the first post 12 and a corresponding one of the openings 24 of the second post 12. Additional timbers 50 may be provided depending on the number of corresponding openings 24 located on adjacent posts 12. If a single level of posts 12 and landscape timbers 50 is desired, then a cap 30 is placed atop the body member 14 such that the underside 34 of the cap 30 faces the body member 14 and such that the second receivers 36 receive a respective one of the protrusions 26 of the body member 14 in order to help interference fit maintain the cap 30 upon the otherwise open top of the body member 14.

However, if the system 10 is to be more than one level in height, then a second body member 14 is sat atop the first body member 14 such that the protrusions 26 on the upper surface 18 of the lower positioned body member 14 are received within the first set of receivers 28 located on the lower surface 16 of the upper positioned body member 14 so as to interference connect the two body members 14 to one another. The internal cavity 22 of one or both of the body members 14 may be filled with the desired weighting element. Additional posts 12 may be stacked on top one another until the desired height is received with timbers 50 extending between stacked post sets. A cap 30 is placed atop the uppermost post 12 as described earlier.

Sets of bases 44, posts 12, caps 30, and timbers 50 are laid out in the desired fashion for the architectural design desired. Once all elements are in place, a plug 38 may be inserted into each opening 24 of each post that does not have a timber 50 received therein in order to aesthetically plug each such opening 24.

Like the Cravatt system, the landscape timber anchoring system may 10 have slots located on each of a pair of adjoining posts so that a plank may extended between the two posts and such that the plank's ends are received within the respective slot on the respective post 12

While the invention has been particularly shown and described with reference to an embodiment thereof, it will be appreciated by those skilled in the art that various changes in form and detail may be made without departing from the spirit and scope of the invention.

I claim:

1. An anchoring system comprising at least one anchoring device,
   a) wherein each anchoring device comprises:
      i. at least one body member,
      ii. wherein the body member is substantially in the shape of a prism,
      iii. wherein the body member is arranged and configured to be capable of secure stacking between similarly configured body members,
      iv. wherein each anchoring device is at most five body members tall and the at least one body member tall,
      v. wherein the body members have three to sixteen substantially rectangular sidewalls,
      vi. wherein thickness of the rectangular sidewalls is relatively less than the width or length of the rectangular sidewall,
      vii. wherein each rectangular sidewall is connected to two other rectangular sidewalls wherein each rectangular sidewall forms a first angle with respect to an adjacent sidewall,
      viii. wherein at least one sidewall in each body member contains an opening having a shape that is substantially the same as the shape of the cross section of a landscape timber wherein the area of the opening is slightly larger than the area of the landscape timber,
      ix. wherein each body member contains a first structural support that is connected to each rectangular sidewall,
      x. wherein each body member has a series of protrusions along the upper surface of the body member and an equal number of receivers on the lower portion of the body member,
      xi. wherein each anchoring device is substantially in the shape of a prism.
2. The anchoring system of claim 1 wherein the at least one anchoring device is at least two anchoring devices, further comprising a landscape timber that is anchored between the openings of a first anchoring device and a second anchoring device.
3. The anchoring system of claim 1 wherein a lowermost body member is substantially adjacent to a ground and each substantially rectangular sidewall is substantially perpendicular to the orientation of the ground.
4. The anchoring system of claim 1 wherein each body member has an internal cavity and wherein at least one additional structural support is located within the internal cavity of each body member that is generally perpendicular to the first structural support.
5. The anchoring system of claim 1, wherein a base is incorporated below and in substantial alignment with a lowest stackable element of the anchoring device and a cap is incorporated above and in substantial alignment with a highest stackable element in the anchoring device.
6. The anchoring system as in claim 1 further comprising a weighting material that is received within an internal cavity of the body members wherein the weighting material is selected from water, sand, rock and aggregate.
7. The anchoring system of claim 1 wherein at least one of the at least one body members are made from a plastic.
8. The anchoring system of claim 1 further comprising:
   a) a third anchoring device;
   b) landscape timbers anchored between the openings in the second and the third anchoring device.
9. An anchoring system comprising:
   a. A series of stackable elements substantially configured in the form an anchoring device of variable height, the anchoring device being vertically oriented with respect to a ground;
   b. wherein each stackable element has a vertical structural component that makes up one or more side elements of the stackable element;
   c. wherein each stackable element has an upper portion and a bottom portion;
   d. wherein the upper portion of a first stackable element from the series of stackable elements interacts with the bottom portion of a second stackable element from the series of stackable elements to secure the second stackable element against horizontal displacement with respect to the first stackable element;
   e. wherein the vertical structural components are thin in comparison to a height of the vertical structural components;
   f. wherein the stackable elements of the series of stackable elements are stacked such that the vertical structural components of each stackable element are substantially in alignment with the vertical structural components of any adjacent stackable element of the series of stackable elements;
   g. wherein each stackable element has at least two openings in the vertical structural components, each of the at least two openings being arranged and configured to securely accept a landscape timber;
   h. wherein the at least two openings have an opening height less than the height of the stackable element; and
   i. wherein the at least two openings have an opening height nearly as great as the height of the stackable element.
10. The anchoring system of claim 9, wherein the anchoring device is substantially in the form of a prism.
11. The anchoring system of claim 9, wherein the anchoring device is substantially in the form of a column.
12. The anchoring system of claim 9, wherein the each stackable element is substantially in the form of a prism.

13. The anchoring system of claim 9, wherein the each stackable element is substantially in the form of a column.

14. The anchoring system of claim 9, wherein each stackable element has a width that is substantially the same as the depth of the stackable element.

15. The anchoring system of claim 9, further comprising a base incorporated below and in substantial alignment with the lowest stackable element of the anchoring device and a cap incorporated above and in substantial alignment with the highest stackable element in the anchoring device.

16. The anchoring system of claim 9, wherein an upper portion of each of the stackable elements comprises a thin edge along the upper portion of the stackable elements.

17. The anchoring system of claim 9, wherein a bottom portion of each of the stackable elements comprises a thin edge along the bottom portion of the stackable element.

18. The anchoring system of claim 9, wherein each of the stackable elements has an internal structural support.

\* \* \* \* \*